United States Patent
Apgar et al.

(10) Patent No.: US 6,168,368 B1
(45) Date of Patent: Jan. 2, 2001

(54) FRAME ASSEMBLY FOR A CONSTRUCTION MACHINE

(75) Inventors: Curtis W. Apgar, Maple Park, IL (US); Yon C. Chong, Tiara (SG); Timothy S. Conroy, Aurora; James K. Mathieu, Plano, both of IL (US); Craig W. Riediger, Kobe (JP); Charles F. Sieck, Dunlap, IL (US)

(73) Assignee: Caterpillar Inc., Peoria, IL (US)

( * ) Notice: Under 35 U.S.C. 154(b), the term of this patent shall be extended for 0 days.

(21) Appl. No.: 09/043,181

(22) PCT Filed: Mar. 14, 1997

(86) PCT No.: PCT/US97/04186
§ 371 Date: Jul. 2, 1999
§ 102(e) Date: Jul. 2, 1999

(87) PCT Pub. No.: WO98/02621
PCT Pub. Date: Jan. 22, 1998

Related U.S. Application Data

(63) Continuation of application No. 08/682,829, filed on Jul. 12, 1996, now abandoned.

(51) Int. Cl.[7] .................................................. B66C 23/00
(52) U.S. Cl. ........................................... 414/686; 180/418
(58) Field of Search .................................. 414/685, 680, 414/686; 280/785, 781; 180/311, 418

(56) References Cited

U.S. PATENT DOCUMENTS

| | | |
|---|---|---|
| 3,057,496 | 10/1962 | Garske . |
| 4,087,101 | 5/1978 | Shimazaki et al. .................. 280/5 A |
| 4,163,498 | 8/1979 | Grooss et al. ........................ 414/697 |
| 4,768,917 | 9/1988 | Garman ................................ 414/697 |
| 5,568,841 | 10/1996 | Weissbach ........................... 180/311 |

FOREIGN PATENT DOCUMENTS

| | | | |
|---|---|---|---|
| 19523001 | 6/1996 | (DE) | ................................ E02F 3/34 |
| 302942A1 | 11/1988 | (EP) | ................................ E02F 3/34 |

Primary Examiner—Donald W. Underwood
(74) Attorney, Agent, or Firm—William C. Perry; Byron G. Buck; James R. Smith

(57) ABSTRACT

In many types of construction machines, the frame assembly comprises a rear frame that supports the engine and the majority of the drive train components and a front frame that supports the work implement and related structure. In this type of machine, the two frames are normally pinned together and the front frame is articulated with respect to the rear frame by a pair of steering cylinders to provide steering for the machine. In order to provide the required structural support for the components of the work implement and to accommodate the steering forces, the front frame is necessarily quite large. The present invention provides a front frame (12) structure that includes a pair of main side plates (62, 64) that are positioned a preselected distance (W) from one another and mount a lift arm assembly (30) therebetween to minimize the overall width of the frame assembly. The forward end portion of the front frame assembly (12) has a preselected height (H) that permits the front frame to have a low profile. These features provide a frame assembly that allows an operator exceptional visibility to the work implement (42).

21 Claims, 5 Drawing Sheets

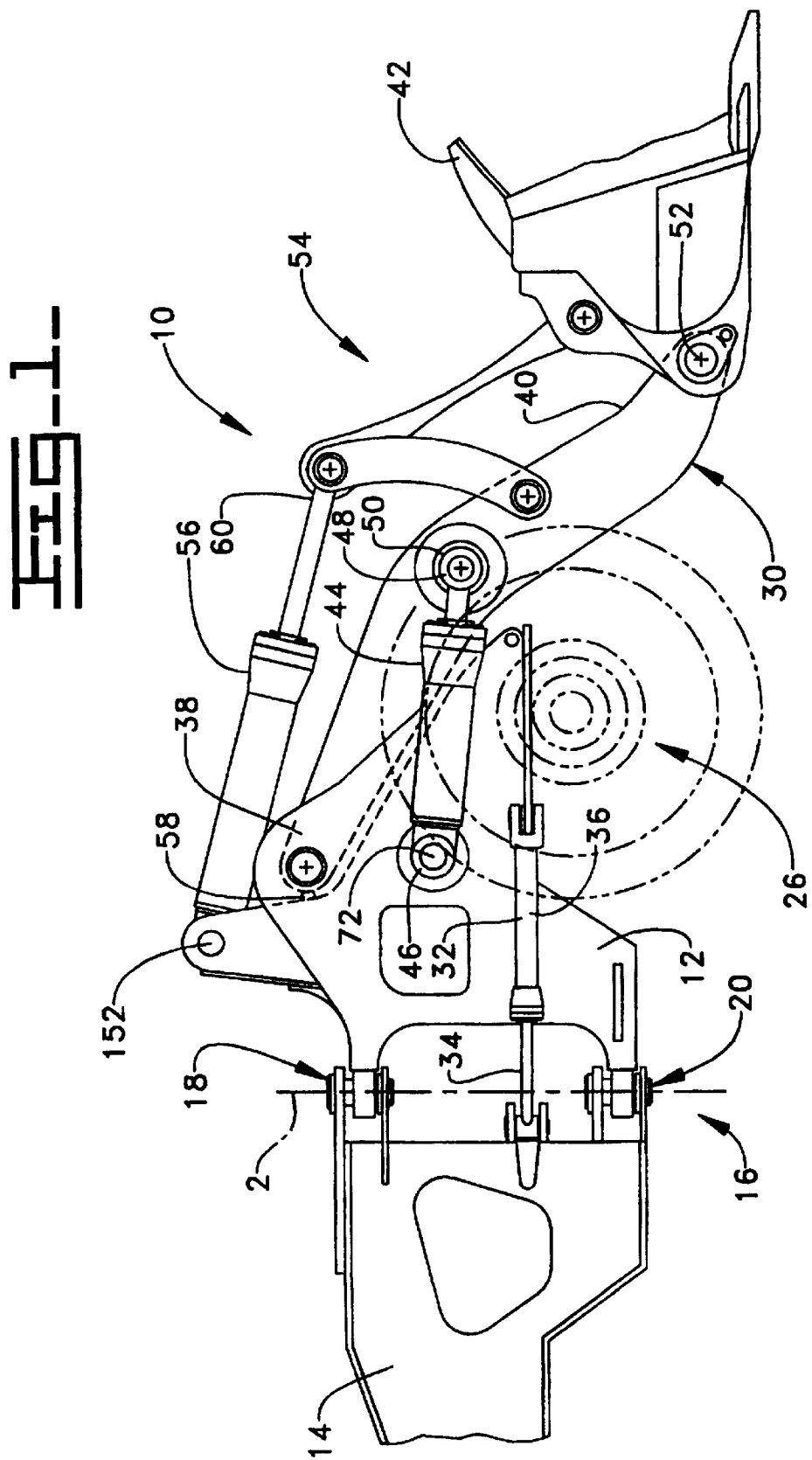
Fig_1

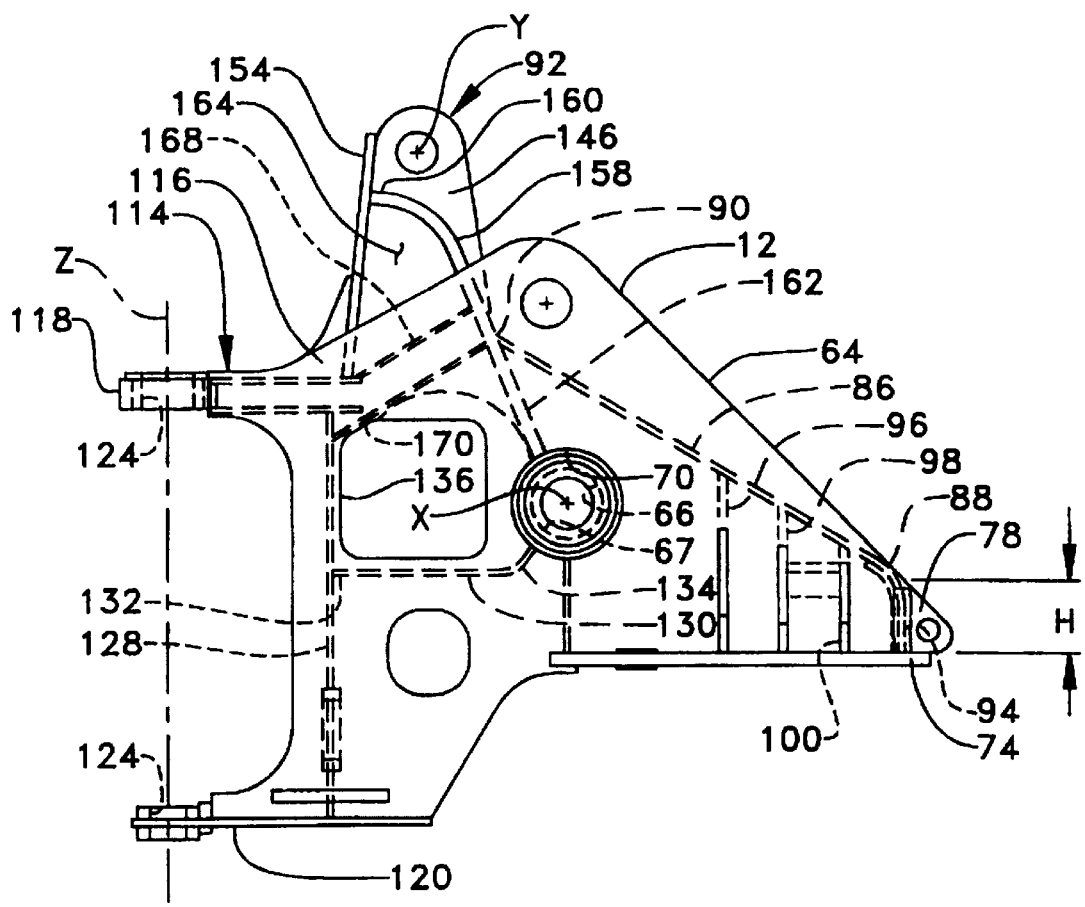

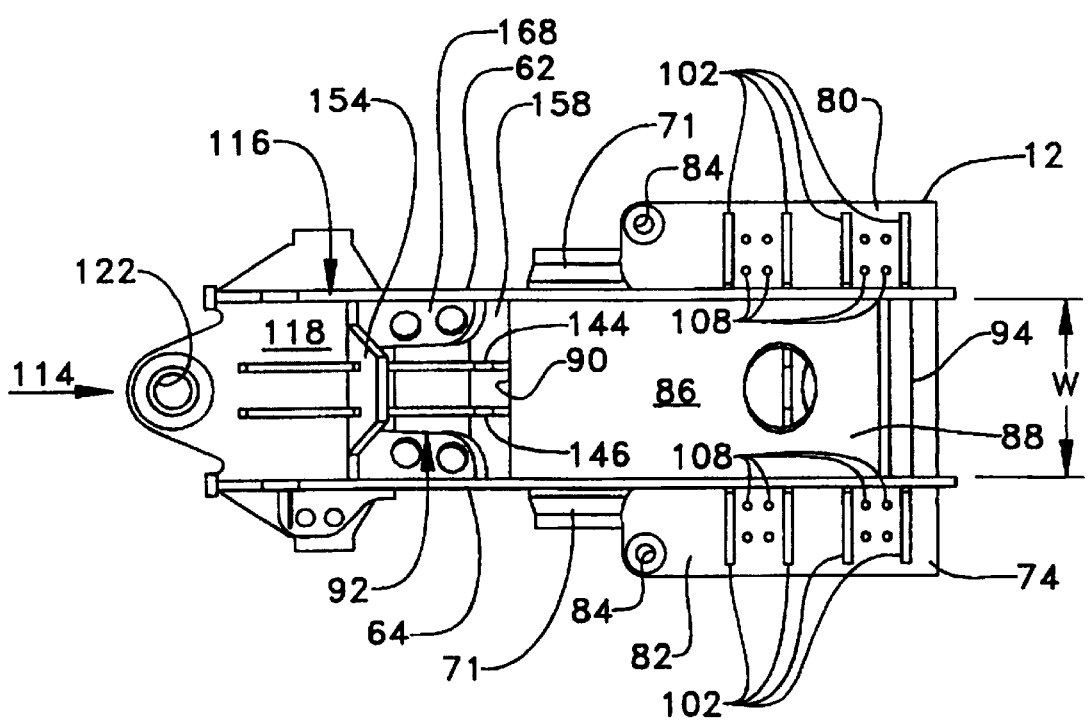

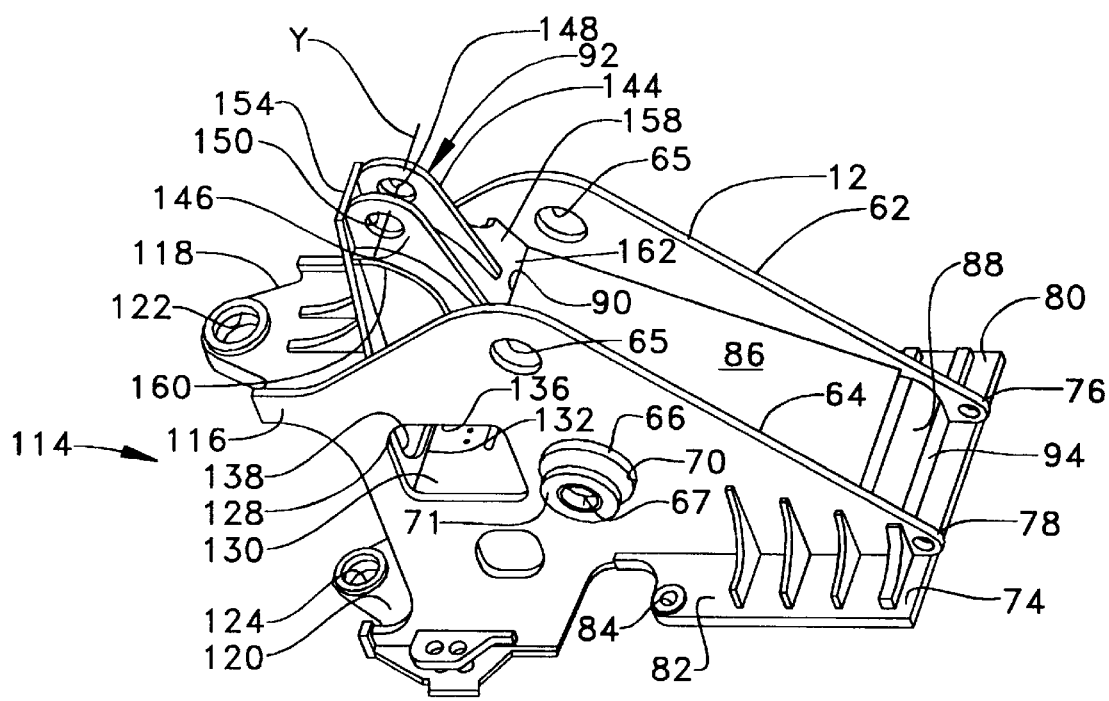
Fig_4_

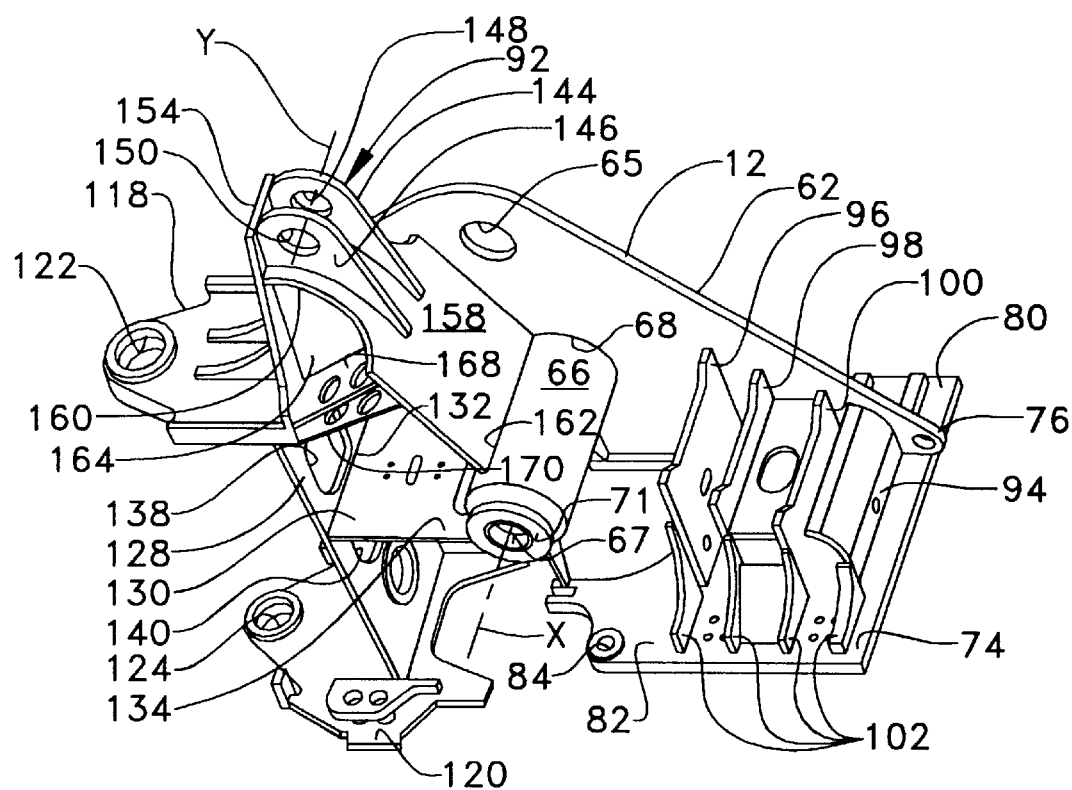
Fig_5_

FRAME ASSEMBLY FOR A CONSTRUCTION MACHINE

This application is a continuation of and claims the benefit of U.S. application Ser. No. 08/682,829, filed Jul. 12, 1996, and titled "Frame Assembly for a Construction Machine", now abandoned.

TECHNICAL FIELD

This invention relates to a frame assembly and more particularly to the frame assembly for a lift arm of a construction machine.

BACKGROUND ART

In the operation of construction machines, it has been found desirable to steer the machine by rotating the front portion of the machine with respect to the rear portion. In order to do this, it is necessary to provide two separate frames that are pinned together about a vertical axis and extend hydraulic cylinders therebetween to obtain the desired rotation or articulation. Typically, the engine and drive train components are mounted on the rear portion of the machine and the work implement is mounted on the front portion of the machine.

In the case of some machines, the articulated wheel loader, for example, the front frame portion is subject to extremely high loads from several different sources. One primary source occurs during operation of the work implement. The work implement is typically attached to the front frame by a pair of lift arms each of which are raised and lowered by a pair of lift cylinders that extend between each lift arm and the front frame. The weight of the lift arms and loaded work implement are the source of substantially loading and it is necessary to provide a front frame assembly with sufficient width to accommodate such loading.

The work implement is also provided with a mechanism that will allow it to be rotated, or tilted with respect to the lift arms. A hydraulic cylinder is interconnected with a plurality of links that are attached to both the lift arm and the work implement to accomplish this. This function also inputs a substantial amount of loading into the front frame.

Yet another source of loading occurs during the steering function of the vehicle. Since the front axle is mounted to the front frame, there must be substantial support for it as it steered over all kinds of terrain. The forces applied by the steering cylinder to rotate the front frame with respect to the rear frame to steer the axle are also quite large. The support brackets for the steering cylinders are normally positioned on the sides of the front frame assembly at locations that are spaced from the axle centerline, through which the forces are transferred. As this spacing increases, so to do the forces passing therethrough, which ultimately requires exceptionally large support brackets for mounting structures.

These factors inherently result in a structure that is quite large in both height and width. With the increase in size however, come several disadvantages. The overall complexity and weight are exceptionally costly in terms of the numbers of components that must be welded together and the expense of material. Additionally, the operation of the machine is hampered because the large size of the structure can reduce the operators visibility to the work implement. This especially true with respect to the line of sight to the base and the corners of the implement.

The present invention is directed to overcoming one or more of the problems set forth above.

DISCLOSURE OF THE INVENTION

In one aspect of the present invention, a frame assembly is provided that includes a pair of side plates. Each side plate has a first and second end portion and a pair of mounting bores defined therethrough along a first axis. The side plates are positioned in spaced parallel relation to one another along a first plane. A mounting support is included that is secured to each of the side plates at a location that is positioned outwardly of the side plates. A first support plate having a generally planar configuration is secured to the first and second side plates at the first end portions of each side plate. A hitch assembly having a pair of vertically spaced plates is positioned between and secured to the first and second side plates at the second end portions of the side plates. A boom member having a first end portion defining a bore therethrough is positioned between and secured to the first and second side plates and is pivotally mounted thereto. The boom member is mounted for relative rotation about the first axis for movement parallel to the side plates. A pair of actuators, each having a first end portion pivotally connected to respective ones of the mounting supports defined by the respective side plates and a second end portion mounted to the boom member are operable to move the boom member along the first plane.

BRIEF DESCRIPTION OF THE DRAWINGS

FIG. 1 is a diagrammatic, side view of a portion of a construction machine that embodies the principles of the present invention;

FIG. 2 is a diagrammatic side elevational view of the front frame portion of the construction machine shown in FIG. 1;

FIG. 3 is a diagrammatic top view of the frame member shown in FIG. 2;

FIG. 4 is a diagrammatic isometric view of the front frame member as viewed from an elevated position at the forward portion of the machine on the operator's right side; and FIG. 5 is a diagrammatic isometric view similar to that of FIG. 4 with portions of the frame removed to more clearly view the structure.

BEST MODE FOR CARRYING OUT THE INVENTION

Referring now to the drawings, particularly FIG. 1, it can be seen that a portion of a construction machine 10 is shown. The machine has a first, or front frame assembly 12 that is pivotally mounted to a second or rear frame assembly 14. The two frame members define a hitch assembly 16 that has spaced apart mounting portions 18 and 20 that are pinned together along a generally vertical axis. The rear frame assembly mounts an engine and a drive train (not shown) that provides motive traction to both a front and rear axle assembly that are mounted on the respective front and rear frames. A pair of wheels are supported by the each axle assembly and provide movement of the machine in a well known manner. In addition to supporting a front axle assembly, generally shown at 26, the front frame 12 provides the support for a lift arm assembly 30. The front frame 12 is rotatable with respect to the rear frame 14 about the pivotal mounting therebetween by a pair of steering cylinders 32 (one shown) that are mounted on opposite sides of the hitch assembly. Each steering cylinder has a first end portion 34 mounted to the rear frame and a second end portion 36 mounted to the front frame in a manner to be described in greater detail hereinafter. Extension and retraction of the steering cylinders causes the front frame to articulate with respect to the rear frame to provide steering for the machine.

The lift arm assembly 30 has a first end portion 38 that is pivotally mounted to the front frame 12 and a second end portion 40 that mounts a work implement 42, such as a bucket. The lift arm is moved in a generally vertical plane by a pair of lift cylinders 44 (one shown) that have a first end portion 46 pivotally mounted to the front frame 12 and a second end portion 48 pivotally mounted to the lift arm at a location shown at 50. The work implement 42 is pivotally mounted to the lift arm at 52 and is rotatable about the mounting by a tilt arrangement 54 that is mounted between the lift arm and the work implement. A tilt cylinder 56 has a first end portion 58 that is rotatably mounted to the front frame 12 and a second end portion 60 that is connected to the tilt arrangement 54. Rotation of the implement about its mounting occurs as a result of the extension and retraction of the tilt cylinder.

Turning now to FIGS. 2–5, the front frame 12 assembly can be seen in greater detail. The front frame assembly 12 is defined by a plurality of main structural members as well as a plurality of subassemblies that provide support for or accommodate loading from the various hydraulic cylinders or other components attached to the frame assembly.

The main structural components of the front frame assembly include a pair of main sides plates 62 and 64 that are generally oriented in a longitudinal direction with respect to a centerline of the machine, and are spaced from one another a preselected width W (FIG. 3). The width W is sufficient to receive the first end portion 38 of the lift arm assembly 30 therebetween.

A cast tubular member 66 extends between the side plates 62 and 64 and is received in bores 68 and 70 that are formed in the respective sides plates 62 and 64 along a common axis X. The tubular member 66 is fixed to the side plates so that the end portions extend beyond the respective side plates to form an outwardly extending stub shaft 71 that serves as a mounting support for the lift cylinders 44. The tubular member defines a bore 67 that is adapted to receive a pin assembly 72 (FIG. 1) that pivotally mounts the first end portions 46 of the lift cylinders 44 at a location that is outwardly adjacent each of the main side plates. It is to be understood that while shown and described as a tubular member, a similar function could be obtained by a support member having a box section. Alternatively, a stub shaft could be individually supported by each side plate with additional bracketing on the individual side plates without departing from the intent of the invention.

A first main support plate 74 is transversely positioned with respect to the side plates 62 and 64 and is secured thereto at a first or forwardly extending end portion 76 and 78 of each main side plate, to lie in a generally horizontal plane. The first main support plate 74 is substantially planar and extends laterally beyond each side plate to define a wing 80 and 82 on opposing sides of the side plates 62 and 64. The first main support plate defines a pair of bores 84 at a rearmost portion thereof, that extend through the first main plate. The bores 84 are adapted for receiving a pin assembly utilized to mount the second end portion 36 of one of the steering cylinders 32.

A second main support plate 86 is positioned between and is connected to the main side plates 62 and 64 and has a first end portion 88 that is affixed to the first main support plate 74 and a second end portion 90 that is secured to a tilt tower assembly 92 that will be described in greater detail hereinafter. The majority of the second main support plate 86 is positioned at an angle to the first main support plate and extends upwardly toward the rear portion of the frame assembly 12. The first end portion 88 of the second main support plate 86 is angled or curved downwardly and defines a vertically extending wall 94 that has a preselected height H that intersects with the angled portion of the second main support plate.

A plurality of spreader plates or gussets 96, 98, and 100 are positioned internally between the main side plates 62 and 64. As can best be seen in FIG. 5, each gusset plate is secured to the respective side plates, the first, transversely extending, main support plate 74 and at least a portion thereof is secured to the angled, second main support plate 86. The gussets are longitudinally spaced from one another along the forward portion of the frame assembly. A plurality of outer gussets, all indicated by reference numeral 102, are positioned on each of the wings 80 and 82 defined by the first main support plate 74 and are aligned with the internally positioned gussets 96, 98 and 100. A plurality of mounting holes 108 are formed in the first main support plate 74 on the forward portion thereof in the area of the spreader plates and gussets. The mounting holes 108 receive suitable fasteners (not shown) that mount the front axle assembly directly to the first main support plate 74. The spreader plates and gussets provide substantial torsional support for the forward portion of the frame assembly 12 to accommodate the loading applied by the axle assembly as the machine is operated.

A hitch assembly 114 is defined on a second or rearwardly directed end portion 116 of the front frame assembly 12. A first, or upper hitch plate 118 extends transversely between the main side plates 62 and 64 and is fixedly secured thereto by welding for example. A second, or lower hitch plate 120 also has at least a portion thereof positioned between the main side plates and is also welded thereto at a lower extremity of the frame assembly 12 at a vertically spaced location from the upper hitch plate 118. Each hitch plate 118 and 120 defines a bore 122 and 124 respectfully, that are aligned with one another on the vertical pivot axis Z about which the front and rear machine frames articulate. A first hitch support plate 128 extends between the upper and lower hitch plates 118 and 120 and is transversely positioned between the main side plates 62 and 64. The hitch support plate 128 is secured to both hitch plates at its upper and lower ends and as well as both side plates. A second hitch support plate 130 extends between the first hitch support plate 128 and the tubular member 66. The second hitch support plate 130 is generally horizontally oriented and has a first end portion 132 that is attached to the first hitch support plate 128 at the approximate midportion thereof and a second end portion 134 that is slightly curved upwardly to engage the tubular member 66 at an angle that will intersect the axis X defined by the tubular member 66. The second hitch support plate 130 is positioned adjacent an opening 136 in each of the main side plates 62 and 64 and provides a support platform for various machine components, such as hydraulic valves utilized in the operation of the tilt and lift cylinders, in an area that is accessible for service. A pair of openings 138 and 140 are defined in the first hitch support plate 128 above and below the second hitch support plate 130 for the same purpose.

A tilt tower arrangement, shown generally at 92 is positioned between and secured to the main side plates 62 and 64. The tilt tower arrangement includes a pair of generally vertically oriented mounting plates 144 and 146 that are transversely spaced from one another a distance sufficient to receive the tilt cylinder 56. The mounting plates 144 and 146 define bores 148 and 150 that are aligned along a common axis Y and receive a pin assembly 152 (FIG. 1) that pivotally mounts the first end portion 58 of the tilt cylinder 56. The mounting plates 144 and 146 are mounted to a generally vertical, first tilt tower support plate 154 that is positioned transversely between the side plates 62 and 64 on the rear side of the mounting plates 144 and 146. A first or lower end portion 156 of the first tilt tower support plate 154 is welded to the respective side plates 62 and 64 and the upper hitch plate 118. A second tilt tower support plate 158 is portioned between and is affixed to the side plates 62 and 64. The second tilt tower support plate 158 has a first end portion 160 that is secured to the first tilt tower support plate 154 and a second end portion 162 that is secured to the tubular member 66. The first end portion 160 is curved and serves as a base plate for the mounting plates 144 and 146. The second end portion 162 is generally planar and is positioned to extend at an angle that substantially intersects with the axes X and Y that are respectively defined by the tubular member 66 and the bores 148 and 150 defined by the mounting plates 144 and 146 respectively. The second end portion 162 engages and is secured to the second end portion 90 of the second, or angled main support plate 86. A pair of support plates, one of which is shown at 164, are provided for each of the mounting plates 144 and 146 respectively. Each support plate is vertically aligned with one of the mounting plates and is mounted to both the first and second tilt tower support plates 154 and 158 along two surfaces thereof. Because the mounting plates and support plates are aligned on opposing sides of the second tower support plate, it is to be understood that they could be one continuous plate without departing from the invention. However, for manufacturing purposes, it is beneficial to separate them into two individual plates positioned as described.

Torsional support for the tilt tower arrangement 142 is provided by a pair of upper and lower plates 168 and 170 that extend between the upper hitch plate 118 and second tower support plate 158. The upper and lower plates 168 and 170 are spaced from one another a distance that is approximately the height of the upper hitch plate 118 and define a box-shaped configuration to provide torsional stiffness to this area of the front frame 12. While not clearly shown, the lower plate 170 includes a portion that is positioned between the support plates 164 and 166. This portion of the lower plate may be a separate plate that may or may not be aligned with the lower plate 170.

INDUSTRIAL APPLICABILITY

The frame assembly 12 set forth above, mounts a lift arm assembly that may be positioned between the main side plates 62 and 64. In doing so the overall width of the frame assembly may be much narrower than prior frame assemblies. Also, the vertical height of the frame assembly at the forward end is also greatly reduced because of the second or angled main support plate 86. In fact the vertical height H established by the angled main support plate may fall within a range of 0.2 to 0.6 of the preselected width established by the side plates 62 and 64. These two physical components provide an operator exceptional visibility to the implement both down the center of the machine as well as to the corners of the work implement.

In addition, the load transfer between the front and rear frames 12 and 14 respectively, is extremely efficient. This is especially true with the mounting of the steering cylinders 32. Actuation of the steering cylinders will cause the front frame to articulate about the vertical axis A to steer the machine. This can be the source of extreme loading. The steering cylinders are mounted directly to the first main support plate 74 and are essentially positioned in line with it. This linear transfer of forces eliminates the need for substantial support brackets thereby reducing weight and cost both in components and manufacturing and assembly.

The hitch assembly 114 is another source of great loading. The subject invention utilizes a single upper and lower hitch plate 118 and 120 respectively, that are interconnected by a continuous first hitch support plate 128. The first hitch support plate is secured on all sides. The upper and lower extremities are welded to the upper and lower hitch plates and the opposing side portions are welded to each side plate 62 and 64. Prior designs have not utilized continuous plates in this manner and have used extensive box sections to provide the required support for the upper and lower hitch plates.

With the frame assembly set forth above, it can be seen that a maximum of structural integrity is obtained with a relatively few components. The positioning of the various plates provides extremely efficient load transfer allows the overall structure to be reduced in size. With the reduction in size, the overall visibility to the forward portion of the machine is greatly increased which will result in an increase in machine performance and productivity. The reduction in size and components also results in a reduction in manufacturing costs since the structure is more easily fabricated.

Other aspects, objects and advantages of this invention can be obtained from a study of the drawings, the disclosure and the appended claims.

What is claimed is:

1. A frame assembly, comprising:
   a pair of side plates having first and second end portions and a pair of mounting bores defined therethrough along a first axis (X) and being in spaced parallel relation to one another a first preselected distance (W) along a first plane;
   a tubular member having first and second end portions and being secured to each of the side plates with the respective first and second end portions thereof positioned outwardly of the respective side plates;
   a first main support plate having a generally planar configuration and being positioned between and secured to the first and second side plates at the respective first end portions thereof;
   a hitch assembly having a pair of vertically spaced plates and being positioned between and secured to the first and second side plates at the respective second end portions thereof;
   a lift arm assembly having a first end portion positioned between the first and second side plates and pivotally mounted for movement parallel to the side plates; and
   a pair of first fluid actuators, each having a first end portion pivotally connected to one of the first and second end portions of the tubular member and a second end portion mounted to the lift arm assembly, said actuators being operable to move the lift arm assembly along the side plates.

2. The frame assembly as set forth in claim 1 wherein the tubular member is adapted to receive a pin assembly therein to rotatably mount the first end portions of the first fluid actuators.

3. The frame assembly as set forth in claim 1 wherein the first main support plate defines a pair of wing members that extend outwardly beyond each of the respective side plates.

4. The frame assembly as set forth in claim 1 wherein a tower assembly having a pair of bores defined along a second axis (Y) that is parallel to the first axis (X), is positioned between and secured to the first and second side plates.

5. The frame assembly as set forth in claim 4 wherein the lift arm assembly has a second end portion that pivotally mounts a work implement for relative movement parallel to the side plates.

6. The frame assembly as set forth in claim 5 wherein a tilt linkage arrangement is connected between the lift arm assembly and the work implement.

7. The frame assembly as set forth in claim 6 wherein a second fluid actuator has a first end portion rotatably mounted to the tower assembly and a second end portion rotatably connected to the tilt linkage arrangement and is operable to rotate the work implement with respect to the lift arm assembly.

8. The frame assembly as set forth in claim 5 wherein the tower assembly has a first and second tower support plate positioned between and secured to the first and second side plates, said second tower support plate being positioned in angular relation to the side plates in general alignment between the first and second axes (X,Y).

9. The frame assembly as set forth in claim 8 wherein a second main support plate having first and second end portions is positioned between and secured to the first and second side plates with the first end portion thereof secured to the first main support plate and the second end portion thereof secured to the tower assembly, said second main support plate being positioned at an angle with respect to the first and second side plates.

10. The frame assembly as set forth in claim 9 wherein the first end portion of the second main support plate defines a generally vertical end face that is spaced from the first main support plate a second preselected distance (H) that is within a range of 0.2 to 0.6 of the first preselected distance (W).

11. The frame assembly as set forth in claim 1 wherein the frame assembly is the front frame assembly of an articulated machine and is connected at the hitch assembly thereof to a rear frame portion of the machine.

12. The frame assembly as set forth in claim 11 wherein a pair of second fluid actuators extend between the front and rear frame portions with respect to the rear frame portion about a vertical axis (Z) that extends therethrough.

13. The frame assembly as set forth in claim 12 wherein each of the second fluid actuators has a first end portion mounted to the rear frame portion and a second end portion mounted to the first main support plate.

14. The frame assembly as set forth in claim 1 wherein a support shaft is defined by each end portion of the tubular member that is positioned between and is secured to the side plates.

15. A frame assembly, comprising:
a pair of side plates having first and second end portions and a pair of mounting bores defined therethrough along a first axis (X) and being in spaced parallel relation to one another a first preselected distance (W) along a first plane;
a tubular member having first and second end portions and being secured to each of the side plates with the respective first and second end portions thereof positioned outwardly of the respective side plates;
a first support plate having a generally planar configuration and being positioned between and secured to the first and second side plates at the respective first end portions thereof;
a hitch assembly having a pair of vertically spaced plates and being positioned between and secured to the first and second side plates at the respective second end portions thereof;
a first hitch support plate secured to the first and second side plates at the respective second end portions thereof;
a lift arm assembly having a first end portion positioned between the first and second side plates and pivotally mounted for movement parallel to the side plates; and
a pair of first fluid actuators, each having a first end portion pivotally connected to one of the first and second end portions of the tubular member and a second end portion mounted to the lift arm assembly, said actuators being operable to move the lift arm assembly along the side plates.

16. The frame assembly as set forth in claim 15 wherein a second hitch support plate having a first end portion secured to the first hitch support plate and a second end portion secured to the tubular member.

17. The frame assembly as set forth in claim 16 wherein the frame assembly is the front frame assembly of an articulated machine and is connected at the hitch assembly thereof to a rear frame portion of the machine, and a pair of fluid actuators extend between the front and rear frame portions with respect to the rear frame portion about a vertical axis (Z) that extends therethrough and each of the fluid actuators has a first end portion mounted to the rear frame member and a second end portion mounted to the first support plate in a generally linear orientation thereto.

18. A frame assembly, comprising:
a pair of side plates having first and second end portions and a pair of mounting bores defined therethrough along a first axis (X) and being in spaced parallel relation to one another a first preselected distance (W) along a first plane;
a tubular member having first and second end portions and being secured to each of the side plates with the respective first and second end portions thereof positioned outwardly of the respective side plates;
a first support plate having a generally planar configuration and being positioned between and secured to the first and second side plates at the respective first end portions thereof;
a hitch assembly having a pair of vertically spaced plates and being positioned between and secured to the first and second side plates at the respective second end portions thereof;
a lift arm having a first end portion positioned between the first and second side plates and pivotally mounted for movement parallel to the side plates; and
a pair of first fluid actuators, each having a first end portion pivotally connected to one of the first and second end portions of the tubular member and a second end portion mounted to the lift arm, said actuators being operable to move the lift arm along the side plates.

19. The frame assembly as set forth in claim 18 wherein the tubular member is adapted to receive a pin assembly therein to rotatably mount the first end portions of the first fluid actuators.

20. The frame assembly as set forth in claim 19 wherein the lift arm has a second end portion that pivotally mounts a work implement for relative movement parallel to the side plates and a tilt linkage arrangement is connected between the lift arm and the work implement.

21. The frame assembly as set forth in claim 20 wherein a second fluid actuator has a first end portion rotatably mounted to a tower assembly and a second end portion rotatably connected to the tilt linkage arrangement and is operable to rotate the work implement with respect to the lift arm.

* * * * *